(12) United States Patent
Formenti et al.

(10) Patent No.: US 7,535,123 B2
(45) Date of Patent: May 19, 2009

(54) APPARATUS AND METHOD FOR SELECTIVELY COUPLING SYSTEM WITH A FIRST POWER SUPPLY OR A SECOND POWER SUPPLY

(75) Inventors: Jose Antonio Vieira Formenti, Allen, TX (US); Mark Allen Hamlett, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/877,546

(22) Filed: Oct. 23, 2007

(65) Prior Publication Data
US 2008/0129121 A1    Jun. 5, 2008

Related U.S. Application Data

(63) Continuation of application No. 10/922,074, filed on Aug. 19, 2004, now abandoned.

(51) Int. Cl.
*H02J 1/00*    (2006.01)
*H02J 3/00*    (2006.01)
(52) U.S. Cl. .............................. 307/80; 307/85; 307/115
(58) Field of Classification Search .................... 307/72, 307/80–81, 85, 131, 115
See application file for complete search history.

(56) References Cited

U.S. PATENT DOCUMENTS
2005/0253560 A1    11/2005    Popescu-Stanesti et al.

OTHER PUBLICATIONS

"Mechanism of High Density Plasma Process for Ion-Driven Etching of Materials," Solid State Electronics 43 (1999), J. W. Lee, J. F. Donohue, K. D. Mackenzie, R. Westerman, D. Johnson, S. J. Pearton (pp. 1769-1775).

*Primary Examiner*—Stephen W Jackson
*Assistant Examiner*—Carlos Amaya
(74) *Attorney, Agent, or Firm*—John J. Patti; Wade J. Brady, III; Frederick J. Telecky, Jr.

(57) ABSTRACT

An apparatus for selectively coupling a system with a first power supply or a second power supply includes: (a) a first switch for effecting a first coupling of the system with the first power supply; (b) a second switch for effecting a second coupling of the system with the second power supply; (c) a first switch control unit coupled for controlling the first switch; (d) a second switch control unit coupled for controlling the second switch; (e) a connection director unit coupled with the first and second switch control units for providing control signals to effect the first and second coupling; at least one of the first and second coupling being effected as an initial coupling establishing a generally time-dependent increasing current between the system and one power supply and a continuing coupling establishing a substantially constant operating current between the system and the one power supply.

26 Claims, 3 Drawing Sheets

APPARATUS AND METHOD FOR SELECTIVELY COUPLING SYSTEM WITH A FIRST POWER SUPPLY OR A SECOND POWER SUPPLY

BACKGROUND OF THE INVENTION

The present invention is directed to systems having a plurality of power supplies. A preferred embodiment of the present invention is directed to systems that have a battery power supply and an alternating current power supply.

Two problems may occur when switching power supplies such as, by way of example and not by way of limitation, when switching between battery power supply and a dc power supply such as would be derived from an AC adapter for a notebook computer or a handheld computing or communication device. First, when powering up the system using an AC adapter power supply, high peak currents (e.g., in excess of 70 Amps) may occur. Such a condition may cause reliability problems and usually adds to the cost of the system because of increased robustness of components required to withstand the rigors of high inrush current such as, by way of example and not by way of limitation, increased robustness of protection components and switches. Second, there can be reliability issues relating to switching between power supplies that have voltages higher than the ratings for commercially available PMOS (P-channel Metal Oxide Semiconductor) power switches (i.e., approximately 20 volts). Circuit designers commonly have added protection circuits to overcome this reliability issue. However, the protection circuitry may sometimes effect a lock up condition when switching between power supplies at high voltage.

There is a need for an apparatus and method that can effect switching between power supplies that limits current inrush when powering up a system using an AC adapter-derived power supply.

There is a need for an apparatus and method that can effect switching between power supplies that avoids a lock up condition when switching between power supplies.

SUMMARY OF THE INVENTION

An apparatus for selectively coupling a system with a first power supply or a second power supply includes: (a) a first switch for effecting a first coupling of the system with the first power supply; (b) a second switch for effecting a second coupling of the system with the second power supply; (c) a first switch control unit coupled for controlling the first switch; (d) a second switch control unit coupled for controlling the second switch; (e) a connection director unit coupled with the first and second switch control units for providing control signals to effect the first and second coupling; at least one of the first and second coupling being effected as an initial coupling establishing a generally time-dependent increasing current between the system and one power supply and a continuing coupling establishing a substantially constant operating current between the system and the one power supply.

A method for selectively coupling a system with a first power supply or a second power supply includes the steps of: (a) in no particular order: (1) providing a first switch connected for switchingly effecting a first coupling of the system with the first power supply; (2) providing a second switch connected for switchingly effecting a second coupling of the system with the second power supply; (3) providing a first switch control unit coupled with the first switch for controlling the first switch; (4) providing a second switch control unit coupled with the second switch for controlling the second switch; and (5) providing a connection director unit coupled with the first switch control unit and coupled with the second switch control unit; (b) operating the connection director unit to provide a first plurality of control signals and to provide a second plurality of control signals; (c) operating the first switch control unit and the second switch control unit to respond to the first plurality of control signals and the second plurality of control signals to selectively effect the first coupling and the second coupling; and (d) effecting at least one of the first coupling and the second coupling as an initial coupling and a subsequent continuing coupling; the initial coupling establishing a generally time-dependent increasing current between the system and one power supply of the first power supply and the second power supply; the continuing coupling establishing a substantially constant operating current between the system and the one power supply.

It is, therefore, an object of the present invention to provide an apparatus and method that can effect switching between power supplies that limits current inrush when powering up a system using an AC adapter power supply.

It is another object of the present invention to provide an apparatus and method that can effect switching between power supplies that avoids a lock up condition when switching between power supplies.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
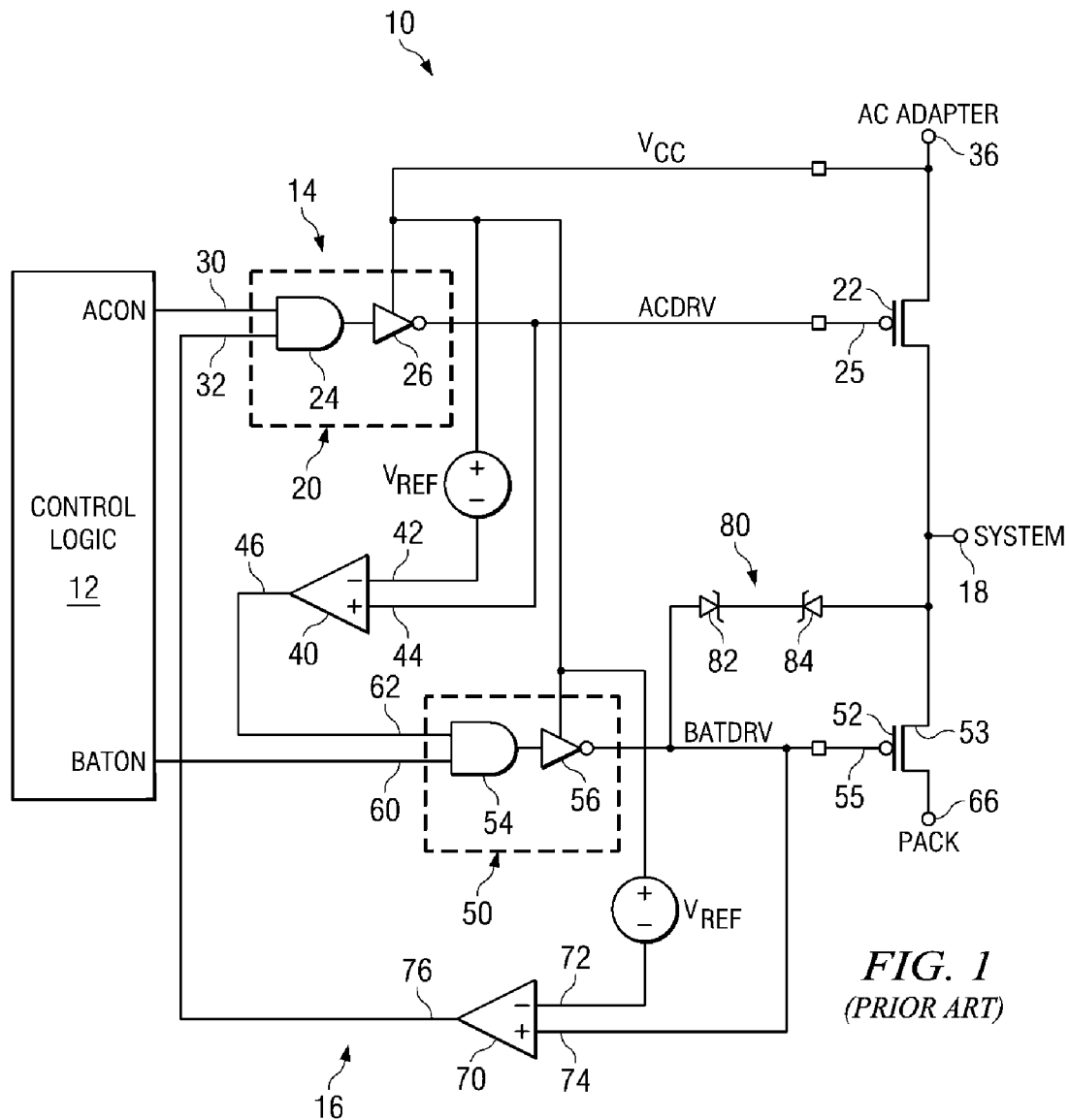
FIG. 1 is an electrical schematic diagram illustrating a prior art apparatus for selectively coupling a system with a first power supply or a second power supply.

FIG. 1 is an electrical schematic diagram illustrating a prior art apparatus for selectively coupling a system with a first power supply or a second power supply. In FIG. 1, an apparatus 10 is configured for selecting a power supply for a dual supply system (not shown in FIG. 1) coupled with a system connection locus 18. Apparatus 10 includes a connection director unit 12 coupled with switching units 14, 16.

Switching unit 14 includes a switch control unit 20 coupled with a PMOS switch 22. Switch control unit 20 includes an AND gate 24 and an "inverter" 26 ("inverter" 26 is a level shifter which translates a digital control signal to a level-shifted digital signal, ACDRV, the new level-shifted signal having a high voltage of $V_{CC}$, for example, and a low voltage of $V_{CC}-V_{NEG}$). $V_{NEG}$ is a predetermined lower supply voltage established at a level below supply voltage $V_{CC}$. The level-shifting inverter 26 will hereafter be called simply an inverter.

AND gate 24 receives a first input 30 (signal ACON; AC adapter voltage connection on) from connection director unit 12 and receives a second input 32 from switching unit 16. When signal ACON received at first input 30 is a "1"and the signal received from switching unit 16 at second input 32 is a "1", AND gate 24 provides a "1" signal to inverter 26. When inverter 26 receives a "1" from AND gate 24, inverter 26 presents a signal ACDRV as a "0" ($V_{CC}$-$V_{NEG}$) to PMOS switch 22, thereby turning on PMOS switch 22 and coupling system connection locus 18 with an AC adapter power supply (not shown in FIG. 1) coupled at an AC adapter power input locus 36. Signal ACDRV is also provided to a comparator 40. Comparator 40 receives a voltage of ($V_{CC}$-$V_{REF}$; $V_{REF}$ is a reference voltage) at an inverting input locus 42. When signal ACDRV is "0", comparator 40 presents a "0" at an output locus 46. When signal ACDRV is "1" (i.e., at voltage level $V_{CC}$), comparator 40 presents a "1" at output locus 46.

Switching unit 16 includes a switch control unit 50 coupled with a PMOS switch 52. Switch control unit 50 includes an AND gate 54 and an inverter 56. AND gate 54 receives a first input 60 (signal BATON; battery connected to system) from connection director unit 12 and receives a second input 62 from switching unit 14. When signal BATON received at first input 60 is a "1" and the signal received from switching unit 14 at second input 62 is a "1", AND gate 54 provides a "1" signal to level-shifting inverter 56. Level-shifting inverter 56 will hereafter be called simply an inverter. When inverter 56 receives a "1" from AND gate 54, inverter 56 presents a signal BATDRV as a "0" to PMOS switch 52, thereby turning on PMOS switch 22 and coupling system connection locus 18 with a PACK (i.e., battery pack) power supply (not shown in FIG. 1) coupled at a PACK power input locus 66. Signal BATDRV signal is also provided to a comparator 70. Comparator 70 receives a reference voltage, $V_{CC}$-$V_{REF}$, at an inverting input locus 72. When signal BATDRV is "0", comparator 70 presents a "0" at an output locus 76. When signal BATDRV is "1", comparator 70 presents a "1" at output locus 76.

Output 46 is coupled with input locus 62 of AND gate 54 so that a "1" cannot be provided to inverter 56 whenever signal ACDRV is a "0". By this arrangement signal BAT DRV cannot close PMOS switch 52 when PMOS switch 22 is closed. Output 76 is coupled with input locus 32 of AND gate 34 so that a "1" cannot be provided to inverter 36 whenever signal BATDRV is a "0". By this arrangement signal ACDRV cannot close PMOS switch 22 when PMOS switch 52 is closed.

Switching unit 16 also includes a protection circuit 80 that includes Zener diodes 82, 84 opposingly coupled between source 53 and gate 55 of PMOS switch 52. Protection circuit 80 keeps $V_{GS}$ (gate-to-source voltage) of PMOS switch 52 from exceeding a predetermined value such as, by way of example and not by way of limitation, 20 volts, absolute (i.e., ±20 volts).

Using apparatus 10, when either PACK power input locus 66 or AC adapter power input locus 36 is switched to couple with system connection locus 18 in response to signals ACON, BATON from connection directing unit 12, comparators 40, 70 operate as "break-before-make" systems. Comparator 70 controls operation of AND gate 24 to ensure that signal BATDRV no longer turns on PMOS switch 52 before signal ACDRV can turn on PMOS switch 22. Comparator 40 controls operation of AND gate 54 to ensure that signal ACDRV no longer turns on PMOS switch 22 before signal BATDRV can turn on PMOS switch 52.

During power up conditions using an AC adapter power supply unit (not shown in FIG. 1) connected with AC adapter power input locus 36 with no battery pack present (or with battery pack present), the secondary circuit of the AC adapter unit (not shown in FIG. 1) can provide very high current to connection locus 18 for short periods of time. Because the AC adapter is already on with power at locus 36, very high current peaks are often present in PMOS switch 22. It is difficult to control how fast the (internal or external) PMOS switch 22 connects the AC adapter. By way of example and not by way of limitation, with notebook computers having a 5 amp standard AC adapter unit coupled, peak currents from the AC adapter unit to the notebook computer (i.e., the system coupled with system connection locus 18) can reach 70 Amps for several hundred microseconds until protection circuitry internal to the AC adapter unit is activated. Such potential for a high current gives rise to reliability considerations in designing systems because of power dissipation (and associated heat) and excessive current through PMOS switch 22. Decreasing rise times at gate 25 of PMOS switch 22 reduces the undesirable current peak but at the expense of additional power dissipation and heat, and is therefore not an effective solution to this current inrush problem.

Another drawback with apparatus 10 is that PMOS 52 must always be turned off using the higher voltage applied at system connection locus 18. Many external switching FET (Field Effect Transistor) devices having a rated $V_{GS}$ at 20 volts. This high voltage requires using protection circuit 80 (described above) to clamp gate 55 of PMOS switch 52 during turn-off transients. For systems operating with voltages higher than the clamping voltage of protection circuit 80, a lockup condition will occur when a command to switch to AC adapter power is issued by connection directing unit 12 and BATDRV locus 55 exceeds the system voltage at system connection locus 18 by more than a predetermined amount, such as 20 volts. That is, when connection directing unit 12 changes signal ACON from "0" to "1" and changes signal BATON from "1" to "0" and voltage at BATDRV input locus 55 exceeds voltage at system connection locus 18 by 20volts or more (for example), Zener diodes 82, 84 (gate clamp diodes) will break down when signal BATDRV increases (BATDRV "1" is typically set to voltage $V_{CC}$. Voltage at system, locus 18, can initially be as low as 0 V). Under such conditions, the threshold voltage at noninverting input locus 74 of amplifier 70 will never be reached, amplifier 70 will not fulfill its break-before-make function, PMOS switch 52 will be off while PMOS switch 22 will also be left off indefinitely, thereby leaving the system locus 18 unpowered indefinitely, even though power is desired from the AC adapter.

Figure 2:
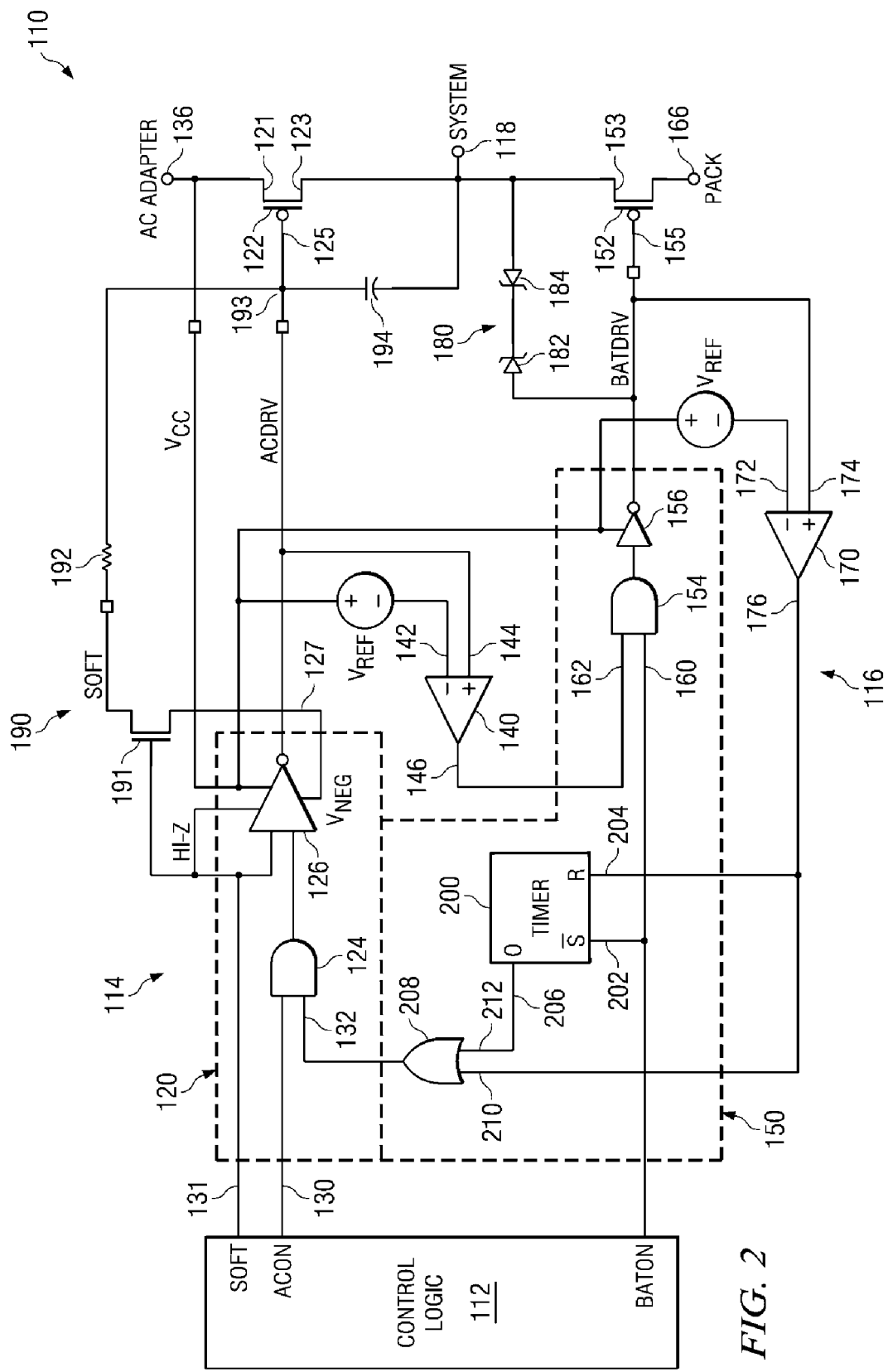
FIG. 2 is an electrical schematic diagram illustrating an apparatus for selectively coupling a system with a first power supply or a second power supply configured according to the present invention.

FIG. 2 is an electrical schematic diagram illustrating an apparatus for selectively coupling a system with a first power supply or a second power supply configured according to the present invention. In FIG. 2, an apparatus 110 is configured for selecting a power supply for a dual supply system (not shown in FIG. 2) coupled with a system connection locus 118. Apparatus 110 includes a connection director unit 112 coupled with switching units 114, 116.

Switching unit 114 includes a switch control unit 120 coupled with a PMOS switch 122. Switch control unit 120 includes an AND gate 124 and an inverting level-shifter (hereafter referred to as an inverter) 126. AND gate 124 receives a first input 130 (signal ACON; AC adapter-to-system on) and a second signal SOFT (soft start) from connection director unit 112. AND gate 124 receives a second input 132 from switching unit 116.

Preferably, AC adapter power is initiated for apparatus 110 using signal SOFT for a predetermined time to initiate a soft start for apparatus 110. To initiate a soft start, signal SOFT is set to a "1". When the signal received from switching unit 116 at input 132 is also a "1" (at the same time signal SOFT is set to a "1") inverter 126 is set to a HIGH Z state in which output signals from inverter 126 do not seek to drive toward a maximum value or toward a minimum value. In this HIGH Z orientation, a soft start circuit 190 is actuated and serves to establish a generally time-dependent increasing current through a PMOS transistor 122. Signal SOFT turns on an NMOS (N channel Metal Oxide Semiconductor) switch 191 to complete a circuit through an RC (Resistor-Capacitor) circuit including a resistor 192 coupled between a $V_{NEG}$ voltage node 127 and a locus 193 in common with a gate 125 of PMOS transistor 122. Soft start circuit 190 also includes a capacitor 194 coupled between locus 193 and drain 123 of PMOS transistor 122, which is in common with a system connection locus 118 to which the system to be powered is coupled (the system is not shown in FIG. 2). Applying signal SOFT to soft start circuit 190 permits a relatively gradual increase of gate current applied at gate 125, thereby establishing a generally time-dependent increasing current between system connection locus 118 and an AC power input locus 136 to which an AC power supply (not shown in FIG. 2) is coupled. High levels of inrush current are thereby avoided. After a time, signal SOFT is set to "0", turning off NMOS transistor 191, and setting signal ACON at first input 130 to "1". When signal ACON is a "1" and the signal received from switching unit 116 at second input 132 is a "1", AND gate 124 provides a "1" signal to inverter 126. When inverter 126 receives a "1" from AND gate 124, inverter 126 presents a signal ACDRV as a "0" to PMOS switch 122, thereby turning on PMOS switch 122 and maintaining coupling between system connection locus 118 and an AC adapter power supply (not shown in FIG. 2) coupled at AC adapter power input locus 136. Signal ACDRV is also provided to a comparator 140. Comparator 140 receives a reference voltage, $V_{CC}$-$V_{REF}$, at an inverting input locus 142. When signal ACDRV is "0", comparator 140 presents a "0" at an output locus 146. When signal ACDRV is "1", comparator 140 presents a "1" at output locus 146.

Switching unit 116 includes a switch control unit 150 coupled with a PMOS switch 152. Switch control unit 150 includes an AND gate 154 and an inverter 156. AND gate 154 receives a first input 160 (signal BATON; battery switch 152 on) from connection director unit 112 and receives a second input 162 from switching unit 114. When signal BATON received at first input 160 is a "1" and the signal received from switching unit 114 at second input 162 is a "1", AND gate 154 provides a "1" signal to inverting level-shifter (hereafter referred to as an inverter) 156. When inverter 156 receives a "1" from AND gate 154, inverter 156 presents a signal BATDRV as a "0" to PMOS switch 152, thereby turning on PMOS switch 152 and coupling system connection locus 118 with a PACK (i.e., battery pack) power supply (not shown in FIG. 2) coupled at a PACK power input locus 166. Signal BATDRV is also provided to comparator 170. Comparator 170 receives a reference voltage of $V_{CC}$-$V_{REF}$ at an inverting input locus 172. When signal BATDRV is "0", comparator 170 presents a "0" at an output locus 176. When signal BATDRV is "1", comparator 170 presents a "1" at output locus 176.

Output 146 is coupled with input locus 162 of AND gate 154 so that a "1" cannot be provided to inverter 156 whenever signal ACDRV is a "0". By this arrangement signal BATDRV cannot close PMOS switch 152 when PMOS switch 122 is closed.

Switching unit 116 also includes a protection circuit 180 that includes Zener diodes 182, 184 opposingly coupled between source 153 and gate 155 of PMOS switch 152. Protection circuit 180 keeps $V_{GS}$ (gate-to-source voltage) of PMOS switch 152 from exceeding a predetermined value such as, by way of example and not by way of limitation, 20 volts.

Output 176 is coupled with a reset node 204 of a timer unit 200. Timer unit 200 receives signal BATON at an inverting set node 202. Timer 200 presents output signals at an output node 206. An OR gate 208 has a first input 210 coupled with output 176 and a second input 212 coupled with timer output node 206.

When signal BATON goes to "0" (and signal ACON goes to "1") indicating an order from connection director unit to disconnect system locus 118 from PACK power input locus 136 and to connect system connection locus 118 with AC power input locus 136, signal BATON is applied at inverting set node 202, thereby setting timer unit 200. If voltage at BATDRV input locus 155 exceeds voltage at system connection locus 118 by 20 volts or more, Zener diodes 182, 184 (gate clamp diodes) will break down when signal BATDRV increases, as described earlier herein in connection with FIG. 1. However, OR gate 208 will apply a "1" signal if either of its input loci 210, 212 experiences a "1" signal. That is, if amplifier 170 reaches sufficient threshold voltage to present a "1" signal at output 176, OR gate 208 will present a "1" to AND gate 124 on line 132, thereby permitting AND gate 124 to respond to signal ACON going to a "1" value by presenting a "1" to inverter 126 and gating PMOS transistor 122 to complete a circuit between system connection locus 118 and AC power input locus 136. A "1" signal on line 176 will also be applied to reset node 204 of timer unit 200 and reset timer unit 200. This is a normal shift from battery power to AC power.

If a lock up condition occurs with amplifier 170 (as described earlier herein with in connection with FIG. 1), then timer unit 200 will ensure that a "1" signal is presented from output node 206 to input 212 of OR gate 208 after a predetermined time has elapsed, so that PMOS switch 122 will be turned on by switch control unit 120 substantially as described when output 176 is a "1". This use of timer unit 200 precludes there being an indefinite period for a lock up condition being experienced by break-before-make circuit (embodied in amplifier 170). Breakdown of Zener diodes 182, 184 and therefore possible indefinite turn off of both PMOS transistor 152 and PMOS transistor 122 is thereby avoided (an indefinite state where there is no system power for an indefinitely long time is avoided). The make-before-break configuration ensures that PMOS switch 152 is turned off before signal ACON can effect turning on of PMOS switch 122. It is preferable that apparatus 110 effect initial powering up using AC adapter power and effect any change to AC adapter power from battery power (or from no initial system power) using an initial condition with signal SOFT at a "1" followed by a continuing condition in which signal ACON is at a "1".

Figure 3:
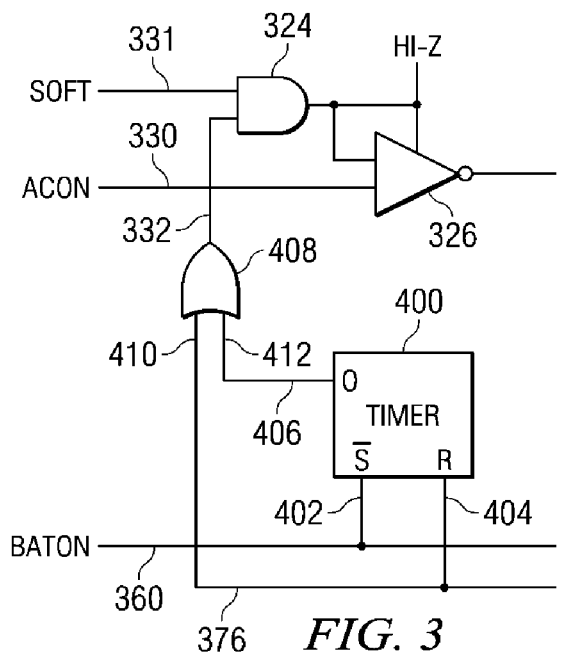
FIG. 3 is an electrical schematic diagram illustrating an alternate embodiment for the timer unit of the apparatus of the present invention.

FIG. 3 is an electrical schematic diagram illustrating an alternate embodiment for the timer unit of the apparatus of the present invention. In FIG. 3, line 376 from a break-before-make circuit embodied in a comparator (not shown in FIG. 3) is coupled with a reset node 404 of a timer unit 400. Timer unit 400 receives signal BATON at an inverting set node 402. Timer unit 400 presents output signals at an output node 406. An OR gate 408 has a first input 410 coupled with output 376 and a second input 412 coupled with timer output node 406.

When signal BATON goes to "0" (and signal ACON goes to "1") indicating an order from a connection director unit (not shown in FIG. 3) to disconnect a system (not shown in FIG. 3) from battery power and to connect the system with AC power, signal BATON is applied at inverting set node 402, thereby setting timer unit 400. If BATDRV voltage with respect to system voltage is sufficiently high, protection circuits protecting transistor switching units will break down, as described earlier herein in connection with FIGS. 1 and 2. OR gate 408 will apply a "1" signal if either of its input loci 410, 412 experiences a "1" signal. If sufficient threshold voltage is present to support normal operations, line 376 will present a "1" at input 410 and OR gate 408 will present a "1" to AND gate 324 on line 332, thereby permitting AND gate 324 to respond to signal SOFT going to a "1" value by presenting a "1" to inverting level-shifter (hereafter referred to simply as inverter) 326 to set inverter 326 in a HIGH Z mode. Only when signal SOFT is "1" and output from OR gate 408 is "1" and signal ACON is "1" can inverter 326 turn on PMOS transistor 122 to complete a circuit between a system and AC power.

If a lock up condition occurs because of not achieving a threshold voltage (as described earlier herein with in connection with FIGS. 1 and 2), then timer unit 400 will ensure that a "1" signal is presented from output node 406 to input 412 of OR gate 408 after a predetermined time has elapsed, so that PMOS switch 322 will be turned on substantially as described when output 376 is a "1". This use of timer 400 precludes there being an indefinite period for a lock up condition being experienced by break-before-make circuit (embodied in comparator 370; not shown). Breakdown of protective circuits and damage to PMOS switches are thereby avoided. The make-before-break configuration of the timer unit configuration illustrated in FIG. 3 ensures that a PMOS switch connecting a system with battery power is turned off before either signal SOFT or signal ACON can effect connecting a system with AC power.

Figure 4:
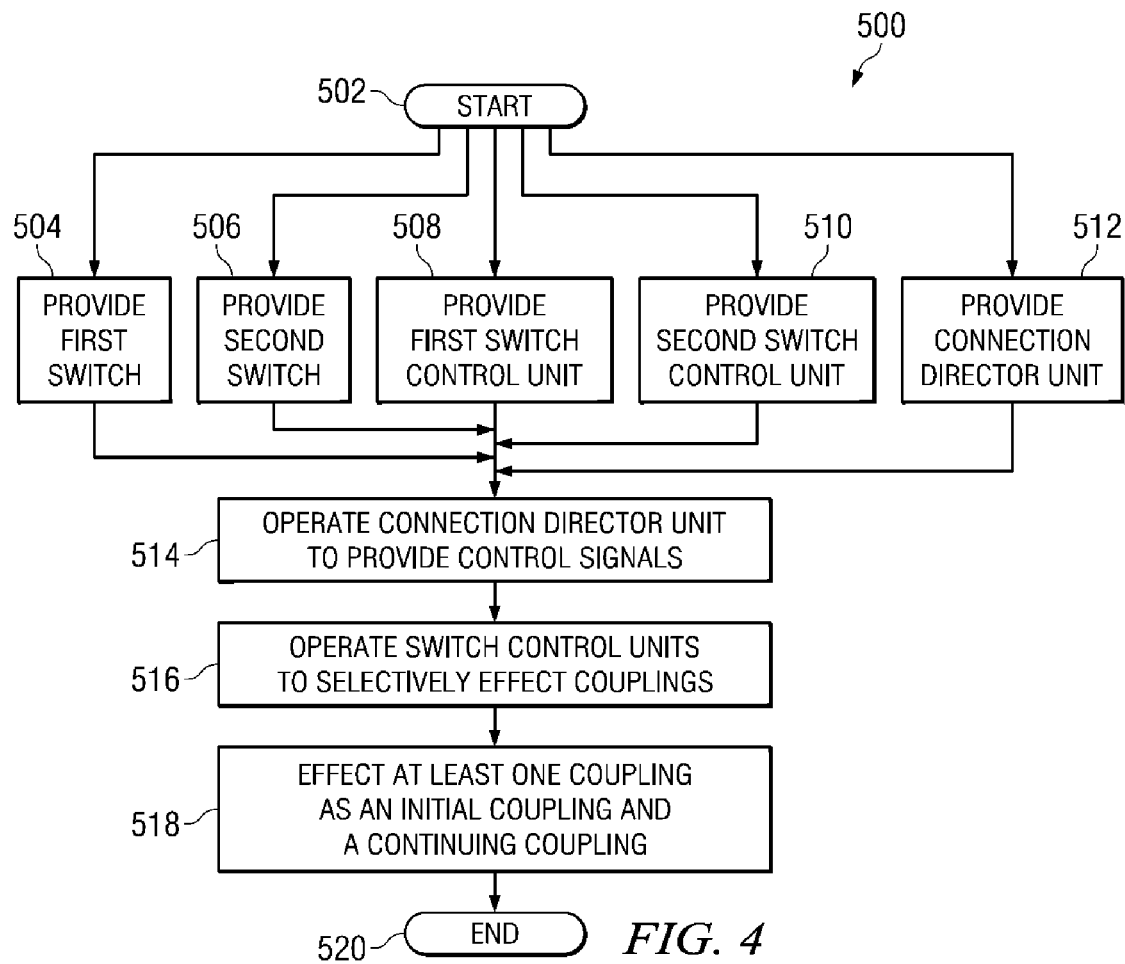
FIG. 4 is a flow diagram illustrating the method of the present invention.

FIG. 4 is a flow diagram illustrating the method of the present invention. In FIG. 4, a method 500 for selectively coupling a system with a first power supply or a second power supply begins at a START locus 502. Method 500 continues with the step of, in no particular order, (1) providing a first switch connected for switchingly effecting a first coupling of the system with the first power supply, as indicated by a block 504; (2) providing a second switch connected for switchingly effecting a second coupling of the system with the second power supply, as indicated by a block 506; (3) providing a first switch control unit coupled with the first switch for controlling the first switch, as indicated by a block 508; (4) providing a second switch control unit coupled with the second switch for controlling the second switch, as indicated by a block 510; and (5) providing a connection director unit coupled with the first switch control unit and coupled with the second switch control unit, as indicated by a block 512.

Method 500 continues with the step of operating the connection director unit to provide a first plurality of control signals and to provide a second plurality of control signals, as indicated by a block 514. Method 500 continues with the step of operating the first switch control unit and the second switch control unit to respond to the first plurality of control signals and the second plurality of control signals to selectively effect the first coupling and the second coupling, as indicated by a block 516.

Method 500 continues with the step of effecting at least one of the first coupling and the second coupling as an initial coupling and a subsequent continuing coupling; the initial coupling establishing a generally time-dependent increasing current between the system and one power supply of the first power supply and the second power supply; the continuing coupling establishing a substantially constant operating current between the system and the one power supply, as indicated by a block 518. Method 500 terminates at an end locus 520.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. An apparatus for selecting a power supply in a dual supply system, the apparatus comprising:
   a connection director unit, the connection director unit presenting a plurality of actuating signals;
   a first switching unit coupled to the connection director unit, coupled to a first power supply and coupled to the system, wherein the first switching unit generating a first indicating signal to indicate whether a first switch is closed;
   a second switching unit coupled to the connection director unit, coupled to a second power supply, and coupled to the system, wherein the second switching unit generating a second indicating signal to indicate whether a second switch is closed;
   wherein the first switching unit is coupled to the second switching unit, and wherein the first switching unit responds to a first signal combination of the second indicating signal and at least one first actuating signal of the plurality of actuating signals for effecting a first coupling between the system and the first power supply; and
   wherein the second switching unit is coupled to the first switching unit, wherein the second switching unit responds to a second signal combination of the first indicating signal and at least one second actuating signal of the plurality of actuating signals for effecting a second coupling between the system and a second power supply, and wherein the second actuating signal including an initiating signal and an operating signal, and wherein the second switching unit responding to the initiating signal to establish a generally time-dependent increasing current between the system and the second power supply, and wherein the at least one second switching unit responds to the operating signal to establish a substantially constant operating current between the system and the second power supply.

2. The apparatus as recited in claim 1 wherein the first switching unit responds to the second signal combination to interrupt the first coupling and wherein the second switching unit responds to the first signal combination to interrupt the second coupling.

3. The apparatus as recited in claim 1 wherein the first switching unit includes a break-before-make circuit; the break-before-make circuit ensuring that the first switching unit interrupts the first coupling before the second switching unit effects the second coupling when the connection director unit presents the second signal combination.

4. An apparatus for selecting a power supply in a dual supply system as recited in claim 1 wherein the first switching unit includes a timer unit coupled for receiving the at least one first actuating signal; the timer unit operating to assure the substantially constant operating current between the system and the second power supply occurs no more than a predetermined time interval after the connection director unit presents the second signal combination.

5. An apparatus for use in a dual supply system, comprising:
- a first switch control unit coupled to a first switch to selectively couple a first power supply to a system;
- a second switch control unit coupled to a second switch to selectively couple a second power supply to the system;
- a connection director unit coupled to the first switch control unit to provide a first operating signal, the connection director coupled to the second switch control unit to provide a second operating signal;
- a first restriction circuit to receive an output of the first switch control unit to generate a first indication signal based on a first comparison between the output of the first switch control unit and a first reference signal;
- a second restriction circuit to receive an output of the second switch control unit to generate a second indication signal based on a second comparison between the output of the second switch control unit and a second reference signal, wherein the first and second restriction circuits prevent the first and second power supplies from being simultaneously coupled to the system, wherein the first switch control unit is to use a first combination of the first operating signal and the second indication signal to control the first switch, and wherein the second switch control unit is to use a second combination of the second operating signal and the first indication signal to control the second switch; and
- an initiation circuit coupled to the first switch, wherein the initiation circuit is to receive an initiation signal from the connection director unit to drive the initiation circuit, wherein the initiation circuit is operable to establish a generally time-dependent increasing current between the system and the first power supply.

6. An apparatus as defined in claim 5, wherein the first and second operating signals and the first and second indication signals are binary.

7. An apparatus as defined in claim 5, wherein the first switch control unit comprises a first inverting level-shifter to generate the output of the first switch control unit used to generate the first indication signal, and the second switch control unit comprises a second inverting level-shifter to generate the output of the second switch control unit used to generate the second indication signal.

8. An apparatus as defined in claim 5, wherein the output of the first switch control unit is to drive a first gate of the first switch and the output of the second switch control unit is to drive a second gate of the second switch.

9. An apparatus as defined in claim 5, further comprising a protection circuit coupled to the second switch control unit.

10. An apparatus as defined in claim 9, wherein the protection circuit comprises first and second diodes opposingly coupled between a source and a gate of the second switch.

11. An apparatus as defined in claim 5, wherein the first operating signal it to establish a substantially constant operating current between the system and the first power supply.

12. An apparatus as defined in claim 5, further comprising a timer unit to receive the second operating signal and a result of the comparison between the output of the second switch control unit and a second reference signal to generate the second indication signal.

13. An apparatus for selectively coupling at least a first power supply and a second power supply to a load, the apparatus comprising:
- a first switch operable to couple the first power supply to the load when actuated;
- a second switch operable to couple the second power supply to the load when actuated; and
- a controller that is coupled to the first switch and the second switch, wherein the controller is adapted to actuate each of the first and second switches, and wherein the controller includes:
  - an actuating source operable to actuate the first switch;
  - a third switch coupled to the actuating source and coupled to the first switch, wherein the third switch is operable to establish a generally time varying current; and
  - a timer coupled to the actuating source that is operable to influence the actuating source.

14. The apparatus of claim 13, wherein the actuating source further comprises a first switch control unit coupled to the first switch to selectively couple a first power supply to the load.

15. The apparatus of claim 14, wherein the first switch control unit further comprises a plurality of logic gates.

16. The apparatus of claim 13, wherein the controller further comprises a second switch control unit coupled to the load, wherein the second switch control unit includes the timer.

17. The apparatus of claim 16, wherein the timer is operable to preclude an indefinite period for a lock-up condition.

18. The apparatus of claim 13, wherein the controller further comprises a comparator that compares an indicator of a battery to a reference voltage.

19. The apparatus of claim 18, wherein the second source is the battery.

20. An apparatus for selectively coupling at least a first power supply and a second power supply to a system, the apparatus comprising:
- a first switch having a pair of first electrodes, wherein one of the first electrodes is coupled to the first power supply and the other first electrode is coupled to the system, and wherein the first switch is operable to couple the first power supply to the system when actuated;
- a second switch having a pair of second electrodes, wherein one of the second electrodes is coupled to the first power supply and the other second electrode is coupled to the system, and wherein the second switch is operable to couple the second power supply to the system when actuated; and
- a controller that is coupled to the first switch and the second switch, wherein the controller is adapted to actuate each of the first and second switches, and wherein the controller includes:
  - an actuating source operable to actuate the first switch;
  - a third switch coupled to the actuating source and coupled to the first switch, wherein the third switch and the actuating source control the conduction state of the first switch so as to adjust the rate of change of current through the first switch when actuation of the switch is desired; and
  - a timer coupled to the actuating source that is operable to influence the actuating source.

21. The apparatus of claim 20, wherein the actuating source further comprises a first switch control unit coupled to the first switch to selectively couple a first power supply to the load.

22. The apparatus of claim 21, wherein the first switch control unit further comprises a plurality of logic gates.

23. The apparatus of claim 20, wherein the controller further comprises a second switch control unit coupled to the load, wherein the second switch control unit includes the timer.

24. The apparatus of claim 23, wherein the timer is operable to preclude an indefinite period for a lock-up condition.

25. The apparatus of claim 20, wherein the controller further comprises a comparator that compares an indicator of a battery to a reference voltage.

26. The apparatus of claim 25, wherein the second source is the battery.

* * * * *